United States Patent [19]
Drechsler et al.

[11] Patent Number: 5,563,342
[45] Date of Patent: Oct. 8, 1996

[54] VEHICLE WHEEL BALANCING MACHINE HAVING SENSING MEANS FOR SENSING GEOMETRICAL DATA OF THE WHEEL

[75] Inventors: Josef Drechsler, Pfungstadt; Klaus Rühl, Gross-Ostheim; Lorenz Lenhardt, Griesheim, all of Germany

[73] Assignee: Hofmann Werkstatt-Technik GmbH, Pfungstadt, Germany

[21] Appl. No.: 416,579

[22] Filed: Apr. 4, 1995

Related U.S. Application Data

[62] Division of Ser. No. 910,917, Jul. 9, 1992, Pat. No. 5,447,064.

[30] Foreign Application Priority Data

Jul. 10, 1991 [DE] Germany .................. 41 22 844.8

[51] Int. Cl.[6] .................................. G01M 1/02
[52] U.S. Cl. .......................... 73/462; 33/203.12
[58] Field of Search .................. 73/462, 471, 487; 301/5.21, 5.22; 33/203, 203.12, 542, 555

[56] References Cited

U.S. PATENT DOCUMENTS

| | | | |
|---|---|---|---|
| 3,741,016 | 6/1973 | Hofmann | 73/462 |
| 4,341,119 | 7/1982 | Jackson et al. | 73/462 |
| 4,576,044 | 3/1986 | Boni | 73/462 |

FOREIGN PATENT DOCUMENTS

| | | |
|---|---|---|
| 0468369 | 1/1992 | European Pat. Off. |
| 2323139 | 4/1977 | France . |
| 2072356 | 9/1981 | United Kingdom . |
| 2139772 | 11/1984 | United Kingdom . |

OTHER PUBLICATIONS

Patent Abstracts of Japan, vol. 11, No. 49 (P-547) (2496) Feb. 14, 1987.

*Primary Examiner*—John E. Chapman
*Attorney, Agent, or Firm*—Cushman Darby & Cushman L.L.P.

[57] ABSTRACT

A balancing machine for vehicle wheels of different sizes and types includes a main shaft, structure for mounting a wheel on the main shaft, and for unbalance measurement which is related to at least one compensating plane of the wheel, sensing structure for detecting a spacing of the at least one compensating plane relative to the machine and for detecting a compensating radius on the wheel. The sensing structure includes a displaceable sensing lever of constant length, the sensing lever having at least a part assuming an angular position proportional to the compensating radius to be detected, a mechanism for pivotally mounting the sensing lever at a first end thereof, structure for displacing the pivotably mounted first end of the lever along a path of given length which is parallel to the main shaft, an element for supplying electrical output signals corresponding to sensed values to an evaluation member in which unbalance measurement values which are ascertained during at least one measuring run are evaluated for determining wheel unbalance and an angle measuring device for measuring an angular position, which is proportional to the compensating radius to be detected, of at least a part of the displaceable sensing lever. The angle measuring device is disposed at the pivot axis of the lever.

6 Claims, 4 Drawing Sheets

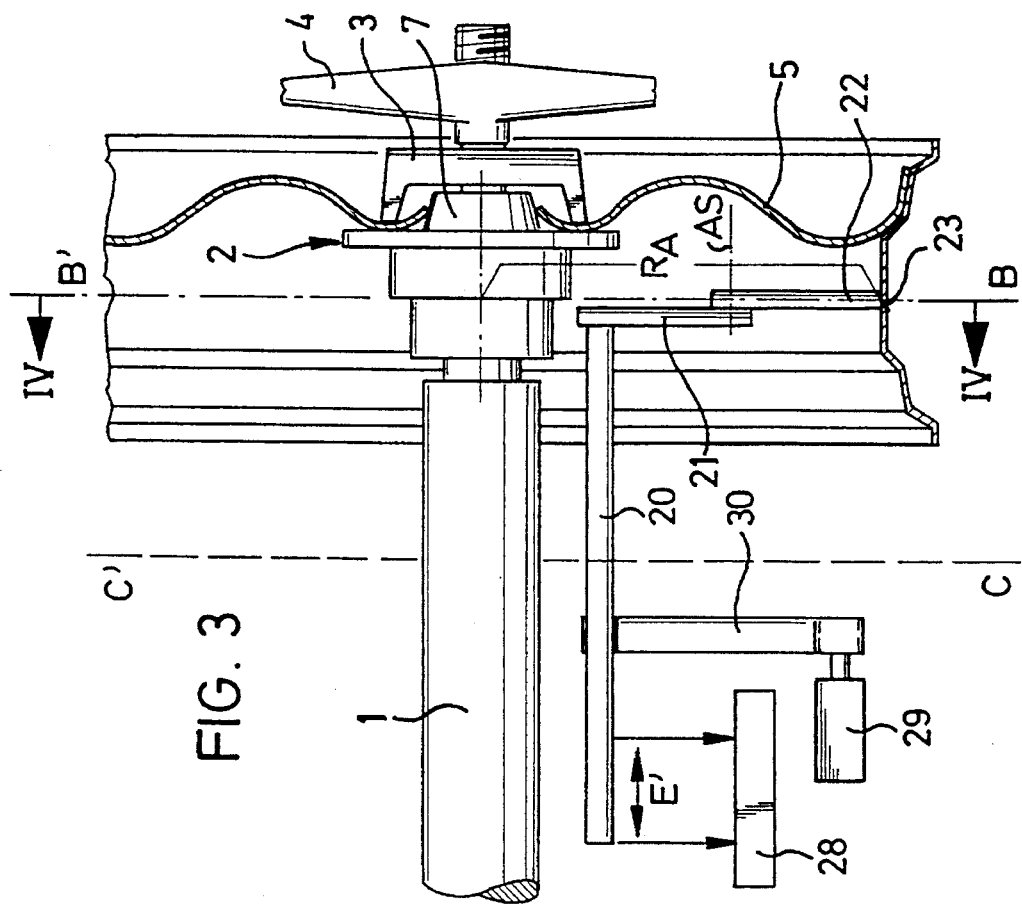
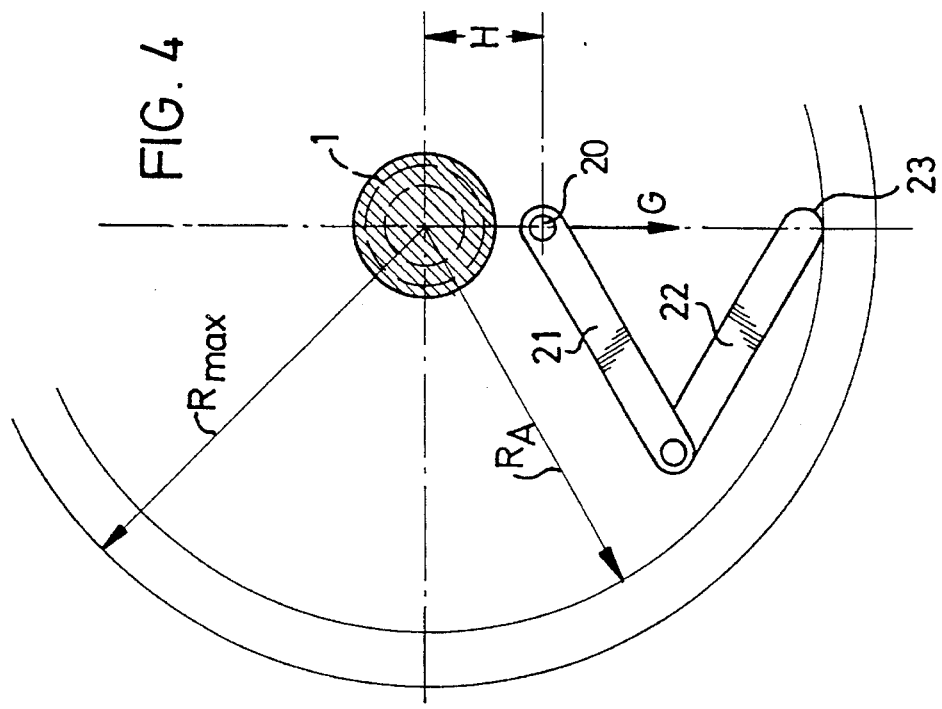

VEHICLE WHEEL BALANCING MACHINE HAVING SENSING MEANS FOR SENSING GEOMETRICAL DATA OF THE WHEEL

This is a division of application Ser. No. 07/910,917, filed Jul. 9, 1992, now U.S. Pat. No. 5,447,064.

BACKGROUND OF THE INVENTION

1. Field of the Invention

The present invention is directed to wheel balancing systems, and more particularly to systems for balancing motor vehicle wheels of different sizes and types.

2. Description of the Related Art

While it is possible to envisage a wheel balancing machine designed for a given size of vehicle wheel, it will be appreciated that it is desirable to have a balancing machine which is capable of dealing with motor vehicle wheels of different sizes and types; more for example, automobile wheels, motorcycle wheels and the wheels of commercial and public vehicles. That, however, requires the machine to be suitably adapted, for the balancing operation, to the size and type of wheel involved.

A balancing machine for motor vehicle wheels, which is designed with that aim in mind, as is to be found in German published specification (DE-AS) No 2 001 972 (corresponding to U.S. Pat. No. 3,741,016 to Hofmann), for balancing in two planes, has a total of three setting potentiometers for ascertaining the geometrical dimensions of the wheel to be balanced. A first setting potentiometer is provided for measuring the spacing between a fixed point of the machine, for example, the wall of the housing thereof, and the inner one of the two compensating planes, that is to say, the planes on the wheel to be balanced at which a balancing operation can be carried out, a second setting potentiometer is provided for ascertaining the distance between the two compensating planes, and the third setting potentiometer is provided for ascertaining a suitable compensating radius at which therefore a compensating or balancing operation can be effected on the wheel. The machine further includes a measuring device for ascertaining and displaying the unbalance magnitudes and angular values. In that machine, each setting potentiometer is connected to a sensing means for sensing the geometrical dimensions of the wheel to be balanced so that the potentiometers are automatically set. The sensing means itself comprises a sensing member in the form of a horizontally displaceable and pivotable lever with sensor or contact roller which can be applied against the rim flange of the wheel to be balanced, for the purposes of simultaneously ascertaining the distance between the compensating planes of the wheel and the compensating radius. The machine has a display device for displaying the sensed values.

Sensing devices are also used in wheel balancing machines which are commercially available (see for example the Hofmann operating instructions for the wheel balancing machine 'geodyna 88/88m', Impressum 9412145-09.86). Two measuring sensing levers of which one detects the distance between the baking machine and the inward rim flange of the wheel and the other detects the outwardly disposed rim flange of the wheel are carried on displaceable measuring shafts which are oriented in parallel relationship with the main shaft of the machine on which a wheel to be balanced is clamped. The measurements, which are taken off, for example, by way of potentiometers, in respect of rim width, inside rim dieter and spacing of the compensating planes on the wheel, are inputted into an electronic evaluation assembly and displayed at a display device.

In known measuring and sensing arrangements for ascertaining the compensating or balancing positions, that is to say the compensating radii and planes, for the balancing weights, the procedure used involves measuring the outside of the rim and the rim diameter minus the thickness of the material of the rim. On the basis of those measurement values, fixed computation algorithms are then used for conversion to a theoretical center of gravity of the compensating weight. When using stick-on weights, more especially concealed weights which are therefore generally to be positioned within the rim dish configuration, that theoretically ascertained center of gravity does not always coincide with the actual position of the center of gravity. The reasons for that are different rim contours and different thicknesses of material at the rims, which result in errors in the radius measurement operation. In addition, the rim contours are such that no weight can be applied to the theoretically ascertained location, and that gives rise to errors in terms of width.

SUMMARY OF THE INVENTION

An object of the present invention is to provide a balancing machine for motor vehicle wheels of different sizes and types, having a sensing arrangement which guarantees accurate detection of the position for the respective compensating weight on the wheel or rim thereof.

Another object of the present invention is to provide a balancing machine for vehicle wheels of different sizes and types, which affords accuracy of operation in conjunction with versatility of use and simplicity of structure.

Still another object of the present invention is to provide a balancing machine for vehicle wheels of varying types and sizes, which affords satisfactory operator simplicity.

In accordance with the present invention, the foregoing and other objects are achieved by a balancing machine for vehicle wheels of different sizes and types, comprising a main shaft and a clamping arrangement for clamping a wheel to be balanced thereon. To provide for balance measurement related to one or more compensating planes of the wheel, the machine has a sensing means for determining the spacing of the compensating plane or planes relative to the machine, and for ascertaining the compensating radius on the wheel. The sensing means includes a sensing member which can be moved into an extended position in a common plane with the longitudinal center line of the main shaft and supplies electrical output signals corresponding to the sensed values. The machine includes an evaluation means to which the electrical output signals are supplied and which is operable to evaluate unbalance measuring values which are ascertained during one or more measuring runs, for determining unbalance of the wheel. The sensing member further includes an angle measuring means for measuring an angular position, which is proportional to said compensating radius, of the sensing member or one or more parts thereof.

As will be appreciated from the following description of preferred embodiments, in the present invention measurement of the angular position of the sensing member is coupled to the extension length thereof, which is ascertained relative to the longitudinal center line of the main shaft of the machine. As a result, only one sensing operation using the sensing member is required for ascertaining the position of the compensating or balancing planes on a vehicle wheel to be balanced and for determining the compensating or balancing radius on the wheel. At the same time, that provides for accurate determination of the position of the balancing weight to be applied, as the sensing member, with its tip, can be placed accurately at the location at which the weight has to be applied to the vehicle wheel.

For that purpose, the sensing member may be displaceable or extensible in a plane which is common with the longitudinal center line of the main shaft, in parallel relationship with that longitudinal center line. Alternatively however, the sensing member or parts thereof may be arranged simultaneously pivotably in that plane, in which case the angle of pivotal movement and the length of extension movement of the sensing member can be detected, when the tip of the sensing member bears against the location on the wheel at which the compensating or balancing weight is to be applied thereto. It is also possible for the sensing member to be arranged pivotably in a plane which is perpendicular to the longitudinal center line of the main shaft of the machine, in which case, for example, a radially extensible lever drive or actuating arrangement can be used for ascertaining the radius of the wheel at which a balancing or compensating weight is to be applied.

It is possible for the sensed values in respect of the spacings of the compensating planes and in respect of the compensating radius to be inputted prior to the measurement operation into the electronic evaluation arrangement, for determining the unbalances which are to be compensated. The sensing operation can also be carried out once again after a measuring run. The tip of the sensing member is then applied to the angular position detected on the wheel by the electronic measuring system, and then the correspondingly sensed values are taken into consideration in terms of any correction which may possibly still be required in regard to the ascertained weight of the balancing weight required. That can thus ensure that the magnitude of the unbalance is determined in the optimum fashion, in dependence on the position at which a balancing weight is to be applied.

In a preferred feature of the invention, the sensing member can be in the form of a sensing lever which can be extended in a common plane with the longitudinal center line of the main shaft of the balancing machine and which is pivotable about its one end, being parallel to the main shaft in its initial position. At its free end the lever has a sensing tip, the sensing position of which can be detected by measuring means for measuring the angle of pivotal movement and the degree of extension of the lever simultaneously in a sensing operation.

In a balancing machine in which the clamping arrangement for fixing a wheel to be balanced on the main shaft of the machine includes a clamping flange, the sensing lever whose tip which is towards the clamping flange on the main shaft and which is extensible makes it possible accurately to measure the precise position of any point within the rim dish configuration and the rim flange. By pivotal mounting of one end of the lever, for example at a hinge or pivot device, and by the lever being guided in a slot which is towards the clamping flange in the wall of the housing of the balancing machine, that design configuration also ensures that, as required, the lever can be pivoted in a common plane with the main shaft.

In accordance with another preferred feature of the invention, if required, the extensible sensing lever can be replaced by a sensing lever of constant length which is pivotably mounted at one end and which is displaceable with its pivotably mounted end along a distance of given length, parallel to the main shaft of the machine.

In both cases, that is to say, both when using an extensible lever and also when using a sensing lever which is displaceable at its pivotably mounted end, the lever is parallel and as close as possible to the main shaft of the machine in the initial or rest position thereof. In that situation, the distance between the lever and the longitudinal center line of the main shaft of the machine is preferably at least approximately equal to the radius of the above-mentioned clamping flange.

In yet another preferred feature of the invention, the sensing means may comprise a measuring shaft or spindle which is parallel to the main shaft of the machine and which is axially displaceable while being prevented from rotating. Fitted on the end of the measuring shaft or spindle which is towards the above-mentioned clamping flange is a multi-component lever transmission with a sensing tip disposed at the free lever end. Upon actuation of the lever transmission, the sensing tip describes a linear radial movement, and the axial displacement of the measuring shaft or spindle and the radial movement of the sensing tip can be detected by suitable detecting or measuring devices.

In that arrangement the spacing of the measuring shaft or spindle relative to the main shaft can be smaller than the smallest compensating or balancing radius on the wheel to be balanced.

Further objects, features and advantages of the present invention will be apparent from the following description of preferred embodiments.

BRIEF DESCRIPTION OF THE DRAWINGS

FIG. 3 is a view corresponding to that shown in FIGS. 1 and 2 of a third embodiment of the machine according to the invention, FIG. 4 shows the arrangement shown in FIG. 3 as viewed in the direction indicated by the arrow IV—IV therein.

DESCRIPTION OF PREFERRED BODY

Figure 1:
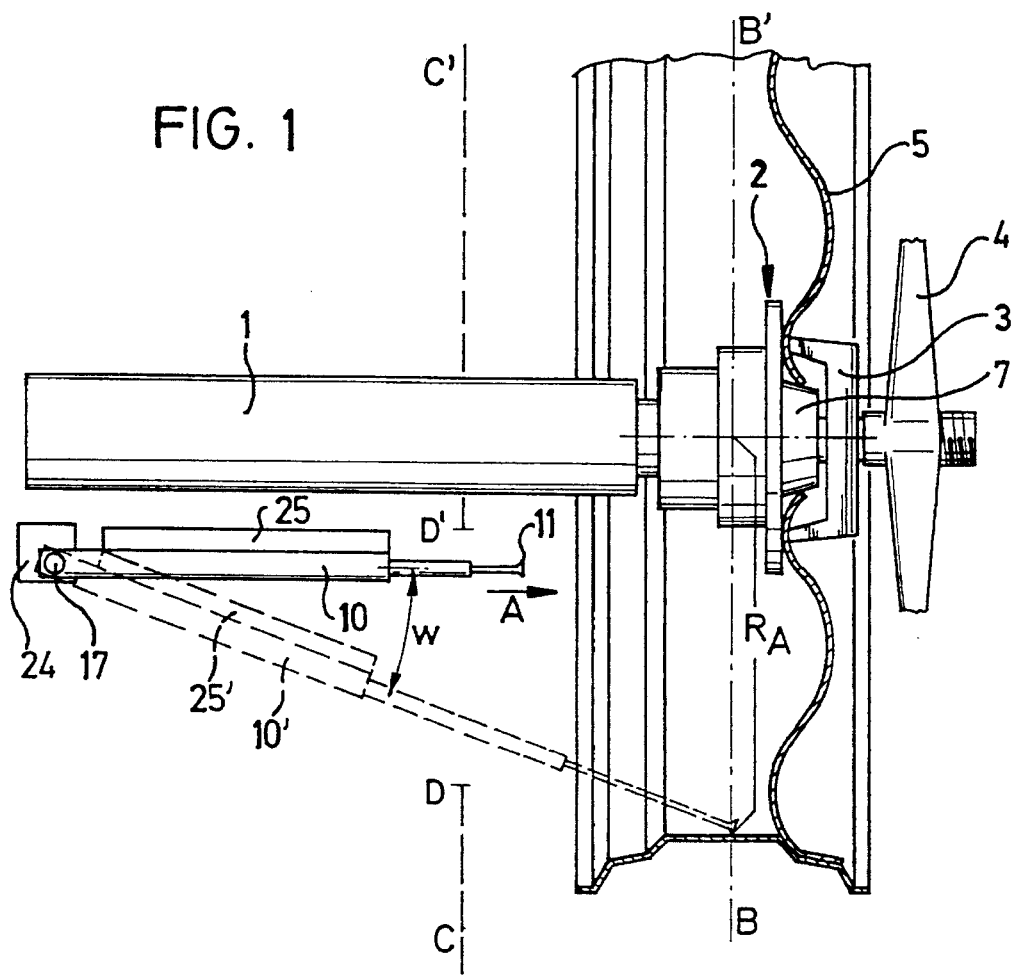
FIG. 1 is a partly broken-away and diagrammatic plan view of a first embodiment of a balancing machine according to the invention, only the main shaft with wheel clamping arrangement and the sensing means being shown for the sake of simplicity of the drawing, while the other known components of the balancing machine and its measuring assembly are also not illustrated.

Referring firstly to FIG. 1, shown therein is a main shaft 1 of a balancing machine with associated wheel clamping and centering arrangement comprising a clamping flange 2 which is non-rotatably connected to the main shaft 1, a cone 7 and screw-on bracing elements 3 and 4.

The machine further has a sensing means comprising an extensible sensing member in the form of a lever 10 which in an initial or rest position is oriented in at least substantially parallel relationship with the main shaft 1 and which has a sensing tip as indicated at 11 which can be pulled out or extended in the direction indicated by the arrow A in FIG. 1. The lever 10 is mounted pivotably by its one end 17 about a pivot point, for example a hinge, which is arranged in stationary relationship relative to the main shaft 1, through an angle which is dependent on the position of the sensing tip 11, for example the angle indicated at w in FIG. 1, into a position shown in broken line and referenced 10'. The angle of pivotal movement of the lever 10 is measured by means of an angle measuring device indicated generally at 24 which can have a rotary potentiometer.

In that arrangement, a suitably arranged slot indicated by D–D' in the wall C–C', which is only shown by a broken line in FIG. 1, of the housing of the balancing machine can provide that the sensing lever 10 is always pivotable only in a plane which is common with the longitudinal center line of the main shaft 1. Moreover, the spacing between the sensing lever 10 in the initial or rest position thereof and the longitudinal center line of the main shaft 1 is so selected that the sensing tip 11 can also go to meet the smallest conceivable compensating or balancing radius on the respective wheel to be balanced, when clamped in position on the main shaft 1.

As will be seen from FIG. 1, the above-described sensing means permits the sensing tip 11 to be readily moved to any points on the disk wheel or rim in order thereby to ascertain for example the location of a compensating or balancing plane B–B' together with the appropriate compensating or balancing radius as indicated at $R_A$. The respective degree of extension in the direction A of the sensing tip 11 of the lever 10 is measured by a measuring device generally indicated at 25 which may contain for example a linear potentiometer and which is of a design configuration as shown, for example, in German published specification (DE-AS) No 2 001 972 (corresponding to U.S. Pat. No. 3,741,016 to Hofmann) to which reference is accordingly directed for incorporation thereof. The pivot angle w is measured by the angle measuring device 24 which for example has a rotary potentiometer and additional transmission assembly as required.

Figure 2:
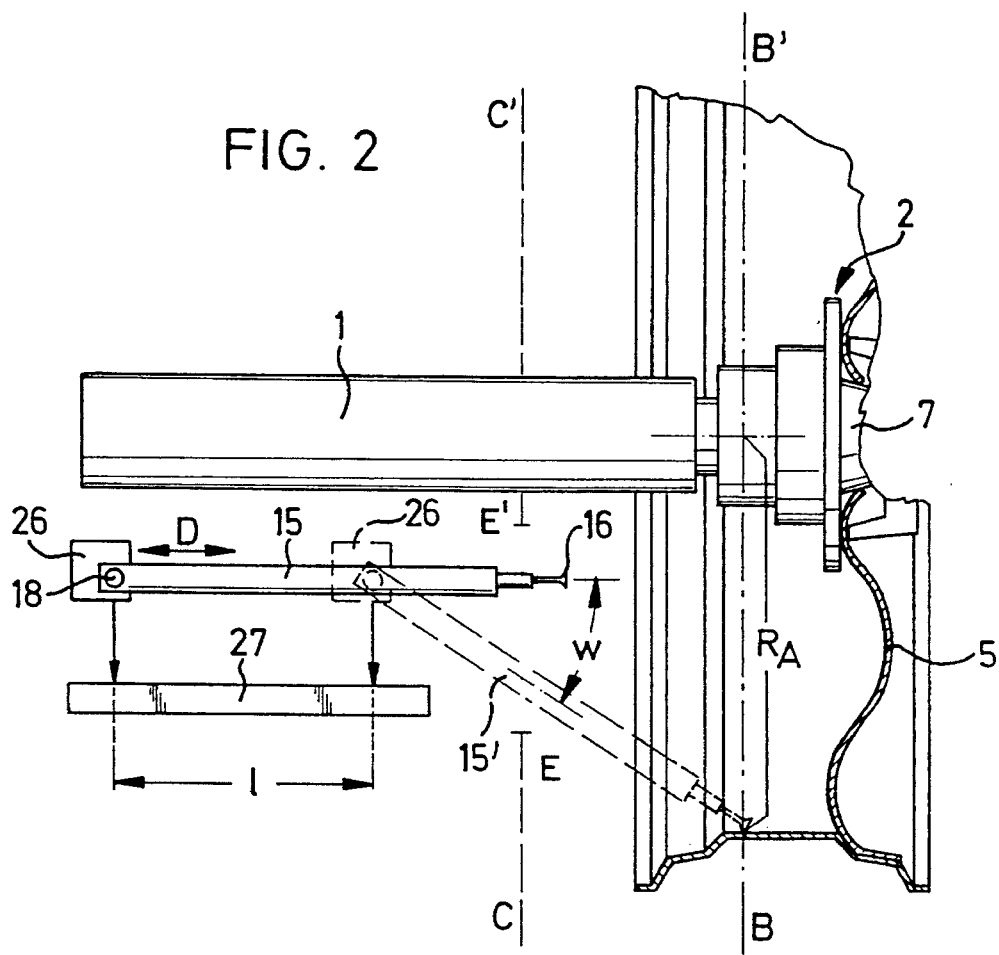
FIG. 2 is a view corresponding to that shown in FIG. 1 of a second embodiment of the machine according to the invention.

Looking now at FIG. 2, the embodiment shown therein, while being otherwise of generally the same configuration as that shown in FIG. 1, differs from the latter in that the extensible sensing lever 10 passing through slot E–E' is replaced by a sensing lever 15 of constant length which, at its end 18 at which the pivot or rotary shaft or spindle is disposed, on which it is mounted, is displaceable in the direction indicated by the double-headed arrow D along a path of movement of given length indicated at '1', parallel to the main shaft 1. In this case also, the sensing tip of the lever, as indicated by 16, can move to contact the rim of the wheel to be balanced at any position thereon by suitable displacement of the sensing lever 15 parallel to the main shaft 1 and pivotal movement of the sensing lever about a given angle, for example the angle w, into the position shown in broken line and referenced 15'. The extension length '1' is measured by a suitable measuring device 27 which, for example, includes a linear potentiometer, for example in accordance with above-mentioned DE-AS No 2 001 972 or U.S. Pat. No. 3,741,016. The angle w is similarly measured by a suitable measuring device 26 which is also displaceable with the lever and which includes a rotary potentiometer and if necessary a suitable transmission arrangement.

Reference is now made to FIGS. 3 and 4 to describe another embodiment of a sensing means in a balancing machine according to the invention. This sensing means has a measuring shaft or spindle 20 which is disposed at a spacing from the longitudinal center line of the main shaft 1, which is smaller than the smallest compensating radius, at which therefore a balancing weight can be applied to a wheel to be balanced. The measuring shaft 20 is axially displaceable relative to the longitudinal center line of the rain shaft 1 in the direction indicated by the double-headed arrow E. The end of the measuring shaft 20 which is towards the clamping flange 2 of the wheel clamping arrangement carries a multi-part lever transmission comprising first and second levers 21 and 22 which are pivotally connected together in the manner shown in FIG. 4. More specifically, the free end of the lever 21 which at its other end is fixed on the shaft 20 is pivotally connected to a first end of the second lever 22, the other end 23 of which constitutes a sensing tip. The lever transmission is so designed that the sensing tip 23 at the free end of the lever 22, upon actuation of the lever transmission, describes a linear radial movement in the direction indicated by the arrow G in FIG. 4.

The axial displacement of the shaft 20 is measured by means of a measuring device generally indicated at 28 in FIG. 3, which can include a linear potentiometer. The measuring device 28 can also be designed in the manner of the measuring device disclosed in above-mentioned DE-AS No 2 001 972 or U.S. Pat. No. 3,741,016.

The lever transmission comprising the first and second levers 21 and 22 serves for measuring the radius of the wheel to be balanced, as indicated at $R_A$. As indicated above, the lever 21 is non-rotatably connected at its first end to the shaft 20 while at its other end it is pivotably connected to the second lever 22 so that the two levers 21 and 22 can be pivoted relative to each other about a common axis as indicated at AS in FIG. 3. In that way it is possible for the sensing tip 23 to be moved linearly along the direction indicated by the arrow G in FIG. 4. That linear movement has the effect of rotary movement of the measuring shaft 20. The rotary movement of the shaft 20 can be transmitted by way of a transmission assembly which is indicated at 30 in FIG. 3 and which may be for example in the form of a gear transmission, to an angle measuring device diagrammatically indicated at 29 in FIG. 3, which may include a rotary potentiometer. The angle of rotary movement of the shaft 20 is proportional to the linear radial movement of the sensing tip 23, starting from an initial or zero position in which the two levers 21 and 22 are arranged substantially parallel to each other. In that way it is possible by means of the arrangement shown in FIGS. 3 and 4 to ascertain both the distance of the compensating plane B–B' from a reference plane C–C' which is fixed with respect to the machine, and also the compensating radius $R_A$, by means of a single sensing procedure.

Figure 5:
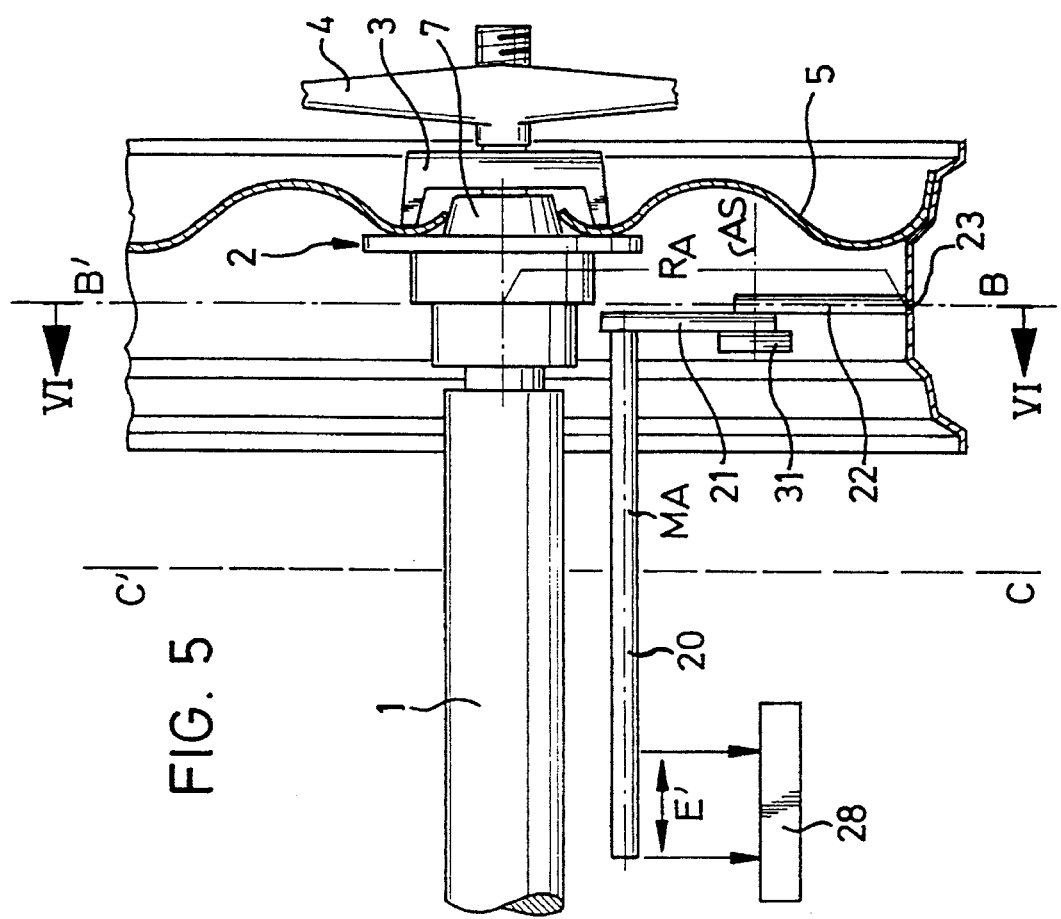
FIGS. 5 and 6 show a further embodiment which is modified in relation to that shown in FIGS. 3 and 4, FIG. 6 being a view of the FIG. 5 arrangement viewing in the direction indicated by the arrow VI—VI therein.
Figure 6:
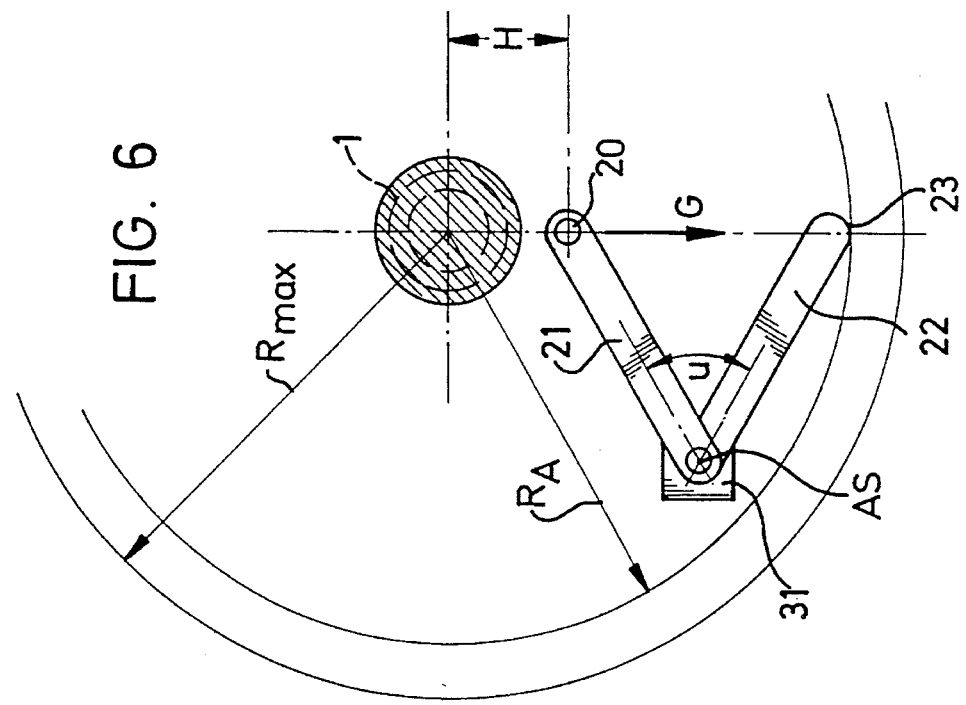

FIGS. 5 and 6, using the same measuring principle as that illustrated in FIGS. 3 and 4, show a modified configuration of the embodiment of FIGS. 3 and 4.

In the construction shown in FIGS. 5 and 6, the lever transmission arrangement comprising the levers 21 and 22 is so designed that the angle of pivotal movement indicated at u between the two levers 21 and 22 is measured by an angle measuring device diagrammatically indicated at 31. The angle measuring device 31 is arranged in the region of the common axis AS of pivotal movement of the two pivotally interconnected levers 21 and 22 and detects the angle of pivotal movement u, for example by way of a suitable gear transmission. The angle measuring device 31 may have a rotary potentiometer for detecting the rotary movement corresponding to the angle u.

As in the embodiment of FIGS. 3 and 4, the displacement of the shaft 20, parallel to the main shaft 1, is detected by a measuring device 28.

The lever 21 can be rotatably connected to the shaft 20. In that case, the shaft 20 can be mounted on the frame structure of the machine in such a way as to be non-rotatable but axially displaceable relative thereto. It will be appreciated that it is also possible for the shaft 20 to be mounted rotatably on the frame structure of the machine and for the lever 21 to be non-rotatably connected to the shaft 20, as in the embodiment shown in FIGS. 3 and 4.

As can be seen in particular from FIG. 6, the pivot angle u forms a measurement in respect of the radius $R_A$, as the spacing H of the center line of the shaft 20 from the longitudinal center line of the main shaft 1 is known.

In a compensating or balancing operation, it is possible for the wheel which is to be balanced to be turned in such a way that the angular position for balancing thereof aligns with the linear radial direction of movement (indicated by the arrow G in FIG. 6) in FIGS. 4 and 6. It is then possible exactly to ascertain the compensating radius precisely at the location at which the appropriate compensating or balancing weight is to be applied. If there are major variations in thickness in the material of the rim at that location, it is possible to effect subsequent correction of the stored unbalance values or balancing weight values in the evaluation arrangement in order in that way to ensure that the balancing weight is ascertained in the optimum fashion. That optimization effect is also a possibility in the embodiments shown in FIGS. 1 and 2.

The lever transmission arrangement comprising the levers 21 and 22, to provide for defined guidance of the sensing tip in a radial linear movement in the direction indicated by the arrow G, may be provided in suitable fashion with gears, more especially in the region of the junction between the two levers 21 and 22 and the junction of the lever 21 to the shaft 20. It is also possible to use toothed belts, pushrods and the like. Another suitable form of transmission configuration is a double-scissor arrangement with two pivot points and synchronous transmission assembly.

Figure 7:
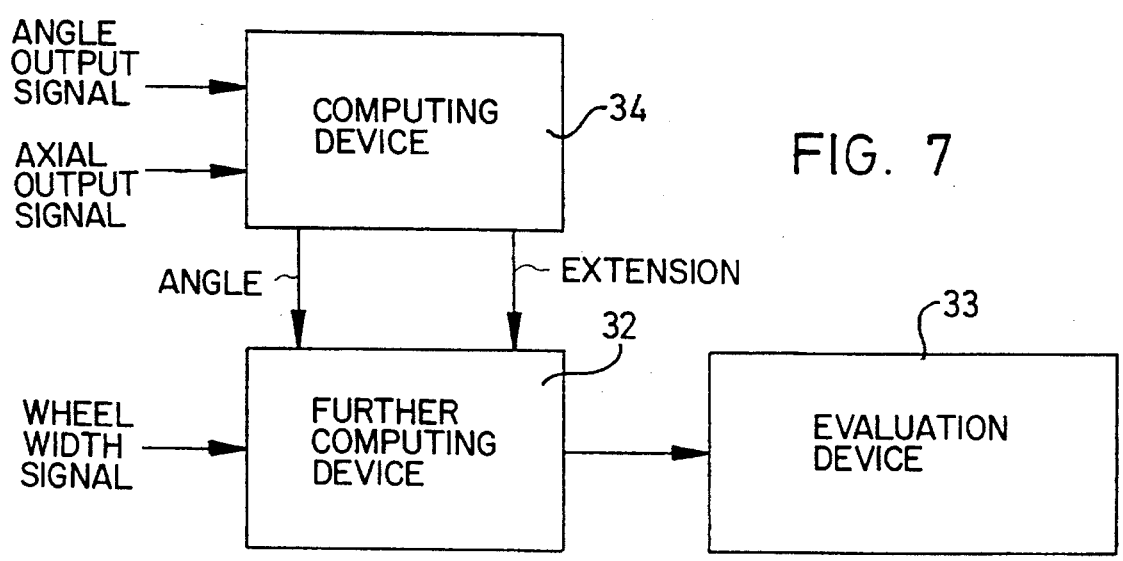
FIG. 7 shows a block circuit diagram for evaluation of the values obtained in a sensing operation in a balancing machine according to the invention.

Both motion components, that is to say the axial component which is required for ascertaining the distance of the plane B–B' of the wheel to be balanced from the reference plane C–C', and the radial component of the sensing tip 23, as is required for detecting the respectively associated radius $R_A$, are detected by means of linear and rotary potentiometers and result in the production of corresponding electrical output signals which are evaluated in an evaluation arrangement or a circuit arrangement as shown in FIG. 7, as will now be described.

The output signals for the detected angles which are proportional to the compensating radii $R_A$, such output signals being supplied by the angle measuring device 24 in FIG. 1, 26 in FIG. 2, 29 in FIGS. 3 and 4 and 31 in FIGS. 5 and 6, are passed to a computing device 34. The computing device 34 also receives the output signals from the measuring device 25 in FIG. 1, 27 in FIG. 2, or 28 in FIGS. 3 and 5, for axial displacement of the sensing member. The output signal corresponding to angle measurement is identified by 'Angle' in FIG. 7 while the output signal corresponding to the extension movement of the sensing member, parallel to the longitudinal axis of the main shaft 1, is identified by 'Extension' in FIG. 7. In the computing device 34, the spacing of the compensating plane B–B' from the reference plane C–C' and the radius $R_A$ associated with the respective compensating plane are computed in accordance with known geometrical algorithms. Such algorithms are simple geometrical relationship which can be readily deduced from the geometrical dimensions which are predetermined by machine structure.

A further computing device 32 which is connected to the output of the computing device 34 receives data in respect of the width of the wheel to be balanced. The width of the wheel can be ascertained, for example, manually by means of a rim width measuring device or calipers and inputted manually into the computing device 32.

The data obtained in that way in regard to plane spacing, compensating radius and rim width are passed to an evaluation device 33 which can be provided with a display device. In the evaluation device 33, the above-indicated data are linked in the unbalance measuring operation to the measurement values supplied by the measurement value sensors in known fashion, and the required balancing weights and angular positions for fitting thereof to the wheel to be balanced are accordingly ascertained.

As already indicated above, the above-mentioned specific compensating values can be stored and a correction operation can also be subsequently carried out if, at the location at which a balancing weight is to be applied, there is a deviation in terms of the dimension of the rim, which is of a given value relative to the values previously ascertained by means of the sensing arrangement.

In all the examples described above, the sensing tip 11 or 16 or 23 respectively can be of such a configuration that, by virtue of having a suitable receiving means for a balancing weight, it can additionally permit a weight such as an adhesive weight to be applied to the appropriate position on the wheel to be balanced, or it can at least provide for marking of that position by means of ink or other marking material.

Figure 8:
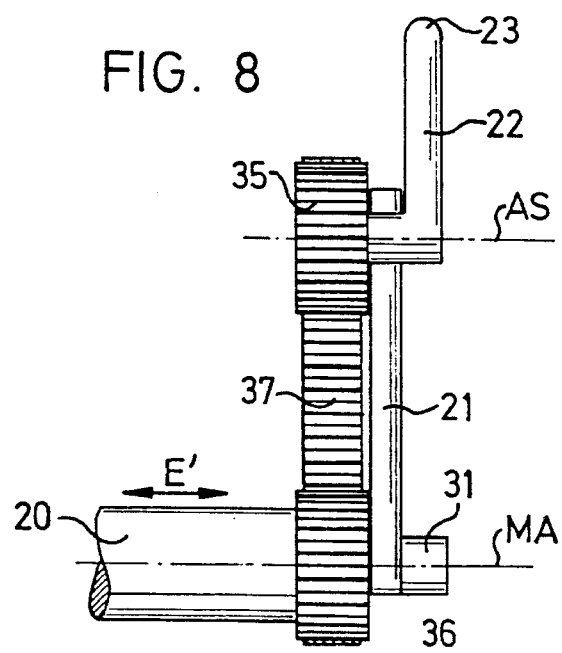
FIG. 8 shows part of a further embodiment of the balancing machine according to the invention.

Reference will now be made to FIG. 8 showing a modified embodiment of the sensing arrangement shown in FIGS. 3 through 6. In this arrangement, a gear 36 is non-rotatably connected to the shaft 20. The shaft 20 can be axially displaced in the direction indicated by the double-headed arrow E' relative to a wheel clamped on the main shaft 1 of the balancing machine, and relative to the frame structure of the machine. The shaft 20 and the gear 36 are arranged non-rotatably relative to the frame structure of the machine but, as already indicated, they can be displaced with a reciprocating movement in the axial direction. The lever 21 is arranged pivotably about the axis MA relative to the shaft 20 and the gear 36. It will be seen that the axis MA is disposed at one end of the lever 21 while at the other end of the lever 21 the second lever 22 is arranged pivotably about the axis AS. A second gear 35 is non-rotatably connected to the lever 22 and the two gears 35 and 36 are drivingly connected together by way of a toothed belt 37. The lever 22 and the gear 35 can be made in one piece.

Upon pivotal movement of the lever 21, by virtue of the rotary movement which is transmitted by way of the toothed belt 37 to the gear 35 and the lever 22, the lever 22 is positively pivoted and the sensing tip 23 thereof is caused to move radially. That radial movement of the sensing tip 23 always occurs in the same radial direction, both radially inwardly and radially outwardly. The pivot angle of the lever 21 about the axis MA relative to the stationary shaft 20 and the gear 36 which is non-rotatably connected thereto is detected by an angle measuring device 31 which can be in the form of a rotary potentiometer. The pivot angle of the lever 21, which is detected by the angle measuring device 31, and therewith also the pivotal movement of the lever 22 which is produced by way of the toothed belt 37 and the gear 35, are proportional to the radial spacing of the sensing tip 23 from the axis MA, the distance of which from the axis of the main shaft 1 is known. That means that the construction shown in FIG. 8 also permits a radial spacing to be measured. As is shown in FIGS. 5 and 6, the angle measuring device 31 in the. FIG. 8 construction may also be disposed in the region of the pivot axis AS at which the two levers 21 and 22 are pivotally connected together. In that case the angle measuring device 31 detects the pivotal movement of the lever 22 relative to the lever 21. Detection of the axial spacing involved, with this construction, is the same as in the embodiments shown in FIGS. 3 through 6.

It will be appreciated that the above-described balancing machines for motor vehicle wheels have been set forth solely by way of example and illustration of the principles of the present invention and that various modifications and alterations may be made therein without thereby departing from the spirit and scope of the present invention.

What is claimed is:

1. A balancing machine for vehicle wheels of different sizes and types, said machine comprising:

a main shaft, means for mounting a wheel on the main shaft, and for unbalance measurement which is related to at least one compensating plane of the wheel, a sensing means for detecting a spacing of said at least one compensating plane relative to the machine and for detecting a compensating radius on the wheel, wherein the sensing means includes
   a) a displaceable sensing lever of constant length, the sensing lever having at least a part assuming an angular position proportional to the compensating radius to be detected;
   b) means for pivotally mounting the sensing lever at a first end thereof;
   c) means for displacing said pivotally mounted first end of said lever along a path of given length which is parallel to the main shaft;
   d) means for supplying electrical output signals corresponding to sensed values to an evaluation means in which unbalance measurement values which are ascertained during at least one measuring run are evaluated for determining wheel unbalance; and
   e) an angle measuring means for measuring an angular position, which is proportional to said compensating radius to be detected, of said at least a part of said displaceable sensing lever, wherein the angle measuring means is disposed at the pivot axis of the lever, and wherein:

the sensing means includes a measuring shaft axially displaceable and parallel to the main shaft, said measuring shaft having an end proximate to the wheel mounting means on the main shaft carrying a multi-member lever sensing means for sensing radius data, said lever sensing means including said displaceable sensing lever, the lever sensing means has an end with a sensing tip disposed thereon which, upon actuation of the lever sensing means, describes a linear radial movement relative to a wheel to be balanced, said machine further includes measuring means for measuring an axial displacement of the measuring shaft and for measuring the radial movement of the sensing tip in dependence on the angular position of said displaceable sensing lever; and said measuring means is for transmitting movement and position parameters of the sensing tip to the measuring unit.

2. A machine as set forth in claim 1 wherein said means for measuring the radial movement of the sensing tip measures said radial sensing tip movement in dependence on a rotary angular position of the measuring shaft.

3. A machine as set forth in claim 1 wherein a spacing of the measuring shaft relative to the main shaft is less than a smallest compensating radius on a wheel to be balanced.

4. A machine as set forth in claim 1 including linear potentiometer means for detecting the displacement of said measuring shaft.

5. A machine as set forth in claim 1, including rotary potentiometer means for detecting the movement of said displaceable sensing lever.

6. A machine as set forth in claim 2 including rotary potentiometer means for detecting rotary movement of said measuring shaft.

* * * * *